(12) United States Patent
Crosmer et al.

(10) Patent No.: US 9,223,020 B1
(45) Date of Patent: Dec. 29, 2015

(54) SYSTEM AND METHOD FOR WEATHER DETECTION USING MORE THAN ONE SOURCE OF RADAR DATA

(75) Inventors: Julianne R. Crosmer, Cedar Rapids, IA (US); Kevin M. Kronfeld, Cedar Rapids, IA (US); Gregory D. Murray, Houston, TX (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 308 days.

(21) Appl. No.: 13/238,606

(22) Filed: Sep. 21, 2011

(51) Int. Cl.
*G01S 13/95* (2006.01)
*G01S 7/00* (2006.01)
*G01S 13/89* (2006.01)
*G01W 1/10* (2006.01)

(52) U.S. Cl.
CPC ............... *G01S 13/953* (2013.01); *G01S 7/003* (2013.01); *G01S 13/89* (2013.01); *G01S 13/951* (2013.01); *G01W 1/10* (2013.01)

(58) Field of Classification Search
CPC ................................ G01S 13/89; G01S 13/953
USPC ........................................................ 342/26 B
See application file for complete search history.

(56) References Cited

U.S. PATENT DOCUMENTS

| | | | |
|---|---|---|---|
| 650,275 A | 5/1900 | Reeve | |
| 3,251,057 A | 5/1966 | Buehler et al. | |
| 3,359,557 A | 12/1967 | Fow et al. | |
| 3,404,396 A | 10/1968 | Buchler et al. | |
| 3,465,339 A | 9/1969 | Marner | |
| 3,491,358 A | 1/1970 | Hicks | |
| 3,508,259 A | 4/1970 | Andrews | |
| 3,540,829 A | 11/1970 | Collinson et al. | |
| 3,567,915 A | 3/1971 | Altshuler et al. | |
| 3,646,555 A | 2/1972 | Atlas | |
| 3,715,748 A | 2/1973 | Hicks | |
| 3,764,719 A | 10/1973 | Dell | |
| 3,781,530 A | 12/1973 | Britland et al. | |
| 3,781,878 A | 12/1973 | Kirkpatrick | |
| 3,803,609 A | 4/1974 | Lewis et al. | |
| 3,885,237 A | 5/1975 | Kirkpatrick | |
| 3,943,511 A | 3/1976 | Evans et al. | |

(Continued)

FOREIGN PATENT DOCUMENTS

| | | |
|---|---|---|
| EP | 1 329 738 B1 | 7/2003 |
| FR | 2658617 A1 | 8/1991 |

(Continued)

OTHER PUBLICATIONS

TOA Technology, printed from website: http://www.toasystems.com/technology.html on Dec. 29, 2010, 2 pages.

(Continued)

*Primary Examiner* — Matthew M Barker
(74) *Attorney, Agent, or Firm* — Angel N. Gerdzhikov; Donna P. Suchy; Daniel M. Barbieri

(57) ABSTRACT

A radar system can include electronics configured to receive communications from a terrestrial location. The communications can include composite weather data from a plurality of sources and scheduling data. The scheduling data can include an indication of timing for sending local weather data sensed by an airborne radar system to the terrestrial location. The terrestrial system can provide composite weather radar data to an airborne source.

20 Claims, 11 Drawing Sheets

(56) References Cited

U.S. PATENT DOCUMENTS

| | | | |
|---|---|---|---|
| 3,964,064 A | 6/1976 | Brandao et al. | |
| 3,968,490 A | 7/1976 | Gostin | |
| 4,015,257 A | 3/1977 | Fetter | |
| 4,043,194 A | 8/1977 | Tanner | |
| 4,223,309 A | 9/1980 | Payne | |
| 4,283,715 A | 8/1981 | Choisnet | |
| 4,283,725 A | 8/1981 | Chisholm | |
| 4,318,100 A | 3/1982 | Shimizu et al. | |
| 4,346,595 A | 8/1982 | Frosch et al. | |
| 4,430,654 A | 2/1984 | Kupfer | |
| 4,435,707 A | 3/1984 | Clark | |
| 4,459,592 A | 7/1984 | Long | |
| 4,533,915 A | 8/1985 | Lucchi et al. | |
| 4,555,703 A | 11/1985 | Cantrell | |
| 4,600,925 A | 7/1986 | Alitz et al. | |
| 4,613,938 A | 9/1986 | Hansen et al. | |
| 4,649,388 A | 3/1987 | Atlas | |
| 4,658,255 A | 4/1987 | Nakamura et al. | |
| 4,684,950 A | 8/1987 | Long | |
| 4,742,353 A | 5/1988 | D'Addio et al. | |
| 4,761,650 A | 8/1988 | Masuda et al. | |
| 4,835,536 A | 5/1989 | Piesinger et al. | |
| RE33,152 E | 1/1990 | Atlas | |
| 4,914,444 A | 4/1990 | Pifer et al. | |
| 4,928,131 A | 5/1990 | Onozawa | |
| 4,940,987 A | 7/1990 | Frederick | |
| 5,036,334 A | 7/1991 | Henderson et al. | |
| 5,049,886 A | 9/1991 | Seitz et al. | |
| 5,057,820 A | 10/1991 | Markson et al. | |
| 5,077,558 A | 12/1991 | Kuntman | |
| 5,105,191 A | 4/1992 | Keedy | |
| 5,159,407 A | 10/1992 | Churnside et al. | |
| 5,164,731 A | 11/1992 | Borden et al. | |
| 5,173,704 A | 12/1992 | Buehler et al. | |
| 5,177,487 A | 1/1993 | Taylor et al. | |
| 5,198,819 A | 3/1993 | Susnjara | |
| 5,202,690 A | 4/1993 | Frederick | |
| 5,208,600 A | 5/1993 | Rubin | |
| 5,221,924 A | 6/1993 | Wilson, Jr. | |
| 5,262,773 A | 11/1993 | Gordon | |
| 5,291,208 A | 3/1994 | Young | |
| 5,296,865 A | 3/1994 | Lewis | |
| 5,311,183 A | 5/1994 | Mathews et al. | |
| 5,311,184 A | 5/1994 | Kuntman | |
| 5,331,330 A | 7/1994 | Susnjara | |
| 5,396,220 A | 3/1995 | Markson et al. | |
| 5,402,116 A * | 3/1995 | Ashley | 340/870.1 |
| 5,469,168 A | 11/1995 | Anderson | |
| 5,479,173 A | 12/1995 | Yoshioka et al. | |
| 5,485,157 A | 1/1996 | Long | |
| 5,517,193 A | 5/1996 | Allison et al. | |
| 5,521,603 A | 5/1996 | Young | |
| 5,534,868 A | 7/1996 | Gjessing et al. | |
| 5,568,151 A | 10/1996 | Merritt | |
| 5,583,972 A | 12/1996 | Miller | |
| 5,592,171 A | 1/1997 | Jordan | |
| 5,602,543 A | 2/1997 | Prata et al. | |
| 5,615,118 A | 3/1997 | Frank | |
| 5,648,782 A | 7/1997 | Albo et al. | |
| 5,654,700 A | 8/1997 | Prata et al. | |
| 5,657,009 A | 8/1997 | Gordon | |
| 5,686,919 A | 11/1997 | Jordan et al. | |
| 5,726,656 A | 3/1998 | Frankot | |
| 5,757,322 A | 5/1998 | Ray et al. | |
| 5,771,020 A | 6/1998 | Markson et al. | |
| 5,828,332 A | 10/1998 | Frederick | |
| 5,838,239 A | 11/1998 | Stern et al. | |
| 5,839,080 A | 11/1998 | Muller et al. | |
| 5,907,568 A | 5/1999 | Reitan, Jr. | |
| 5,920,276 A | 7/1999 | Frederick | |
| 5,945,926 A | 8/1999 | Ammar et al. | |
| 5,973,635 A | 10/1999 | Albo | |
| 6,034,760 A | 3/2000 | Rees | |
| 6,043,756 A * | 3/2000 | Bateman et al. | 340/945 |
| 6,043,757 A | 3/2000 | Patrick | |
| 6,081,220 A | 6/2000 | Fujisaka et al. | |
| 6,138,060 A | 10/2000 | Conner et al. | |
| 6,154,151 A | 11/2000 | McElreath et al. | |
| 6,154,169 A | 11/2000 | Kuntman | |
| 6,177,873 B1 | 1/2001 | Cragun | |
| 6,184,816 B1 | 2/2001 | Zheng et al. | |
| 6,201,494 B1 | 3/2001 | Kronfeld | |
| 6,208,284 B1 | 3/2001 | Woodell et al. | |
| 6,236,351 B1 | 5/2001 | Conner et al. | |
| 6,240,369 B1 | 5/2001 | Foust | |
| 6,246,367 B1 | 6/2001 | Markson et al. | |
| 6,281,832 B1 | 8/2001 | McElreath | |
| 6,289,277 B1 | 9/2001 | Feyereisen et al. | |
| 6,297,772 B1 | 10/2001 | Lewis | |
| 6,340,946 B1 | 1/2002 | Wolfson et al. | |
| 6,381,538 B1 | 4/2002 | Robinson et al. | |
| 6,388,607 B1 | 5/2002 | Woodell | |
| 6,388,608 B1 | 5/2002 | Woodell et al. | |
| RE37,725 E | 6/2002 | Yamada | |
| 6,405,134 B1 | 6/2002 | Smith et al. | |
| 6,424,288 B1 | 7/2002 | Woodell | |
| 6,441,773 B1 | 8/2002 | Kelly et al. | |
| 6,456,226 B1 | 9/2002 | Zheng et al. | |
| 6,480,142 B1 | 11/2002 | Rubin | |
| 6,496,252 B1 | 12/2002 | Whiteley | |
| 6,501,392 B2 * | 12/2002 | Gremmert et al. | 340/971 |
| 6,512,476 B1 | 1/2003 | Woodell | |
| 6,518,914 B1 | 2/2003 | Peterson et al. | |
| 6,549,161 B1 | 4/2003 | Woodell | |
| 6,560,538 B2 | 5/2003 | Schwinn et al. | |
| 6,563,452 B1 * | 5/2003 | Zheng et al. | 342/26 R |
| 6,577,947 B1 | 6/2003 | Kronfeld et al. | |
| 6,590,520 B1 | 7/2003 | Steele et al. | |
| 6,597,305 B2 | 7/2003 | Szeto et al. | |
| 6,603,425 B1 | 8/2003 | Woodell | |
| 6,606,564 B2 | 8/2003 | Schwinn et al. | |
| 6,614,382 B1 | 9/2003 | Cannaday et al. | |
| 6,650,275 B1 | 11/2003 | Kelly et al. | |
| 6,650,972 B1 | 11/2003 | Robinson et al. | |
| 6,667,710 B2 | 12/2003 | Cornell et al. | |
| 6,670,908 B2 | 12/2003 | Wilson et al. | |
| 6,677,886 B1 | 1/2004 | Lok | |
| 6,683,609 B1 | 1/2004 | Baron et al. | |
| 6,690,317 B2 | 2/2004 | Szeto et al. | |
| 6,703,945 B2 | 3/2004 | Kuntman et al. | |
| 6,720,906 B2 | 4/2004 | Szeto et al. | |
| 6,738,010 B2 | 5/2004 | Steele et al. | |
| 6,741,203 B1 | 5/2004 | Woodell | |
| 6,744,382 B1 | 6/2004 | Lapis et al. | |
| 6,771,207 B1 | 8/2004 | Lang | |
| 6,788,043 B2 | 9/2004 | Murphy et al. | |
| 6,791,311 B2 | 9/2004 | Murphy et al. | |
| 6,828,922 B1 * | 12/2004 | Gremmert et al. | 340/949 |
| 6,828,923 B2 | 12/2004 | Anderson | |
| 6,839,018 B2 | 1/2005 | Szeto et al. | |
| 6,850,185 B1 | 2/2005 | Woodell | |
| 6,856,908 B2 | 2/2005 | Devarasetty et al. | |
| 6,879,280 B1 | 4/2005 | Bull et al. | |
| 6,882,302 B1 | 4/2005 | Woodell et al. | |
| 6,917,860 B1 * | 7/2005 | Robinson et al. | 701/3 |
| 6,977,608 B1 | 12/2005 | Anderson et al. | |
| 7,030,805 B2 | 4/2006 | Ormesher et al. | |
| 7,042,387 B2 | 5/2006 | Ridenour et al. | |
| 7,082,382 B1 | 7/2006 | Rose et al. | |
| 7,109,912 B1 | 9/2006 | Paramore et al. | |
| 7,109,913 B1 | 9/2006 | Paramore et al. | |
| 7,116,266 B1 | 10/2006 | Vesel et al. | |
| 7,129,885 B1 | 10/2006 | Woodell et al. | |
| 7,132,974 B1 | 11/2006 | Christianson | |
| 7,139,664 B2 | 11/2006 | Kelly et al. | |
| 7,145,503 B2 | 12/2006 | Abramovich et al. | |
| 7,161,525 B1 | 1/2007 | Finley et al. | |
| 7,200,491 B1 | 4/2007 | Rose et al. | |
| 7,242,343 B1 | 7/2007 | Woodell | |
| 7,259,714 B1 | 8/2007 | Cataldo | |
| 7,292,178 B1 | 11/2007 | Woodell et al. | |
| 7,307,576 B1 | 12/2007 | Koenigs | |
| 7,307,577 B1 | 12/2007 | Kronfeld et al. | |
| 7,307,583 B1 | 12/2007 | Woodell et al. | |

(56) References Cited

U.S. PATENT DOCUMENTS

| | | | |
|---|---|---|---|
| 7,307,756 | B2 | 12/2007 | Walmsley |
| 7,352,317 | B1 | 4/2008 | Finley et al. |
| 7,352,929 | B2 | 4/2008 | Hagen et al. |
| 7,365,674 | B2* | 4/2008 | Tillotson et al. ............ 342/26 B |
| 7,372,394 | B1 | 5/2008 | Woodell et al. |
| 7,383,131 | B1 | 6/2008 | Wey et al. |
| 7,417,579 | B1 | 8/2008 | Woodell |
| 7,427,943 | B1 | 9/2008 | Kronfeld et al. |
| 7,471,995 | B1* | 12/2008 | Robinson ......................... 701/3 |
| 7,486,219 | B1 | 2/2009 | Woodell et al. |
| 7,486,220 | B1 | 2/2009 | Kronfeld et al. |
| 7,492,304 | B1 | 2/2009 | Woodell et al. |
| 7,492,305 | B1 | 2/2009 | Woodell et al. |
| 7,515,087 | B1 | 4/2009 | Woodell et al. |
| 7,515,088 | B1 | 4/2009 | Woodell et al. |
| 7,528,613 | B1 | 5/2009 | Thompson et al. |
| 7,541,971 | B1 | 6/2009 | Woodell et al. |
| 7,557,735 | B1 | 7/2009 | Woodell et al. |
| 7,576,680 | B1 | 8/2009 | Woodell |
| 7,581,441 | B2 | 9/2009 | Barny et al. |
| 7,598,901 | B2 | 10/2009 | Tillotson et al. |
| 7,598,902 | B1 | 10/2009 | Woodell et al. |
| 7,633,428 | B1* | 12/2009 | McCusker et al. .......... 342/26 B |
| 7,633,431 | B1 | 12/2009 | Wey et al. |
| 7,664,601 | B2 | 2/2010 | Daly, Jr. |
| 7,696,921 | B1 | 4/2010 | Finley et al. |
| 7,714,767 | B1 | 5/2010 | Kronfeld et al. |
| 7,728,758 | B2* | 6/2010 | Varadarajan et al. ....... 342/26 B |
| 7,733,264 | B1 | 6/2010 | Woodell et al. |
| 7,859,448 | B1 | 12/2010 | Woodell et al. |
| 7,868,811 | B1 | 1/2011 | Woodell et al. |
| 7,917,255 | B1 | 3/2011 | Finley |
| 7,973,698 | B1 | 7/2011 | Woodell et al. |
| 7,982,658 | B2 | 7/2011 | Kauffman et al. |
| 8,022,859 | B2* | 9/2011 | Bunch et al. ................ 342/26 R |
| 8,054,214 | B2* | 11/2011 | Bunch .......................... 342/26 R |
| 8,072,368 | B1 | 12/2011 | Woodell |
| 8,081,106 | B2 | 12/2011 | Yannone |
| 8,089,391 | B1 | 1/2012 | Woodell et al. |
| 8,111,186 | B2 | 2/2012 | Bunch et al. |
| 8,159,369 | B1 | 4/2012 | Koenigs et al. |
| 8,217,828 | B2* | 7/2012 | Kirk ................................ 342/62 |
| 8,228,227 | B2 | 7/2012 | Bunch et al. |
| 8,902,100 | B1 | 12/2014 | Woodell et al. |
| 2002/0039072 | A1 | 4/2002 | Gremmert et al. |
| 2003/0001770 | A1 | 1/2003 | Cornell et al. |
| 2005/0049789 | A1 | 3/2005 | Kelly et al. |
| 2006/0036366 | A1 | 2/2006 | Kelly et al. |
| 2008/0158049 | A1* | 7/2008 | Southard et al. ............ 342/26 R |
| 2009/0219197 | A1* | 9/2009 | Bunch .......................... 342/26 B |
| 2010/0042275 | A1 | 2/2010 | Kirk |
| 2010/0201565 | A1 | 8/2010 | Khatwa |
| 2011/0148694 | A1 | 6/2011 | Bunch et al. |
| 2012/0139778 | A1 | 6/2012 | Bunch et al. |
| 2013/0234884 | A1 | 9/2013 | Bunch et al. |

FOREIGN PATENT DOCUMENTS

| | | |
|---|---|---|
| WO | WO-98/07047 A1 | 2/1998 |
| WO | WO-98/22834 A1 | 5/1998 |
| WO | WO-03/005060 A1 | 1/2003 |
| WO | WO-2009/137158 | 11/2009 |

OTHER PUBLICATIONS

Triangulation, from Wikipedia, printed from website: http://en.wikipedia.org/wiki/Triangulation on Dec. 29, 2010, 6 pages.

3-D Weather Hazard and Avoidance System, Honeywell InteVue Brochure dated Nov. 2008, 4 pages.

Bovith et al., Detecting Weather Radar Clutter by Information Fusion with Satellite Images and Numerical Weather Prediction Model Output; Jul. 31-Aug. 4, 2006, 4 pages.

Burnham et al., Thunderstorm Turbulence and Its Relationship to Weather Radar Echoes, J. Aircraft, Sep.-Oct. 1969, 8 pages.

Corridor Integrated Weather System (CIWS), www.ll.mit.edu/mission/aviation/faawxsystems/ciws.html, received on Aug. 19, 2009, 3 pages.

Decision on Appeal for Inter Parties Reexamination Control No. 95/001,860, dated Oct. 17, 2014, 17 pages.

Doviak et al., Doppler Radar and Weather Observations, 1984, 298 pages.

Dupree et al.,FAA Tactical Weather Forecasting in the United States National Airspace, Proceedings from the World Weather Research Symposium on Nowcasting and Very Short Term Forecasts, Toulouse, France, 2005, 29 pages.

Final Office Action on U.S. Appl. No. 12/892,663 dated Mar. 7, 2013, 13 pages.

Final Office Action on U.S. Appl. No. 13/246,769 Dated Sep. 16, 2014, 18 pages.

Goodman et al., LISDAD Lightning Observations during the Feb. 22-23, 1998 Central Florida Tornado Outbreak, http:www.srh.noaa.gov/topics/attach/html/ssd98-37.htm, Jun. 1, 1998, 5 pages.

Greene et al., Vertically Integrated Liquid Water—A New Analysis Tool, Monthly Weather Review, Jul. 1972, 5 pages.

Hodanish, Integration of Lightning Detection Systems in a Modernized National Weather Service Office, http://www.srh.noaa.gov/mlb/hoepub.html, retrieved on Aug. 6, 2007, 5 pages.

Honeywell, RDR-4B Forward Looking Windshear Detection/Weather Radar System User's Manual with Radar Operation Guidelines, Jul. 2003.

Keith, Transport Category Airplane Electronic Display Systems, Jul. 16, 1987, 34 pages.

Klingle-Wilson et al., Description of Corridor Integrated Weather System (CIWS) Weather Products, Aug. 1, 2005, 120 pages.

Kuntman et al, Turbulence Detection and Avoidance System, Flight Safety Foundation 53rd International Air Safety Seminar (IASS), Oct. 29, 2000.

Kuntman, Airborne System to Address Leading Cause of Injuries in Non-Fatal Airline Accidents, ICAO Journal, Mar. 2000.

Kuntman, Satellite Imagery: Predicting Aviation Weather Hazards, ICAO Journal, Mar. 2000, 4 pps.

Meteorological/KSC/L71557/Lighting Detection and Ranging (LDAR), Jan. 2002, 12 pages.

Nathanson, Fred E., "Radar and Its Composite Environment," Radar Design Principles, Signal Processing and the Environment, 1969, 5 pages, McGraw-Hill Book Company, New York et al.

Non-Final Office Action on U.S. Appl. No. 12/892,663 Dated May 29, 2013, 14 pages.

Non-Final Office Action on U.S. Appl. No. 13/717,052 Dated Feb. 11, 2015, 15 pages.

Non-Final Office Action on U.S. Appl. No. 13/717,052 Dated Sep. 9, 2014, 8 pages.

Notice of Allowance on U.S. Appl. No. 12/075,103 Dated Aug. 4, 2014, 10 pages.

Notice of Allowance on U.S. Appl. No. 13/246,769 Dated Jan. 8, 2015, 10 pages.

Notice of Allowance on U.S. Appl. No. 13/707,438 Dated Feb. 25, 2015, 11 pages.

Office Action for U.S. Appl. No. 12/892,663, mail date Oct. 22, 2012, 12 pages.

Office Action for U.S. Appl. No. 13/717,052, mail date Aug. 22, 2013, 15 pages.

Office Action on U.S. Appl. No. 12/075,103 Dated Jul. 31, 2013, 8 pages.

Office Action on U.S. Appl. No. 13/246,769 Dated Apr. 21, 2014, 18 pages.

RDR-4B Honeywell User Manual for Forward Looking Windshear Detection/Weather Radar System, Rev. 6, Jul. 2003, 106 pps.

Robinson et al., En Route Weather Depiction Benefits of the Nexrad Vertically Integrated Liquid Water Product Utilized by the Corridor Integrated Weather System, 10th Conference on Aviation, Range, and Aerospace Meteorology (ARAM), 2002, 4 pages.

(56) References Cited

OTHER PUBLICATIONS

Stormscope Lightning Detection Systems, L3 Avionics Systems, retrieved on Jul. 11, 2011, 6 pages.

Waldvogel et al., The Kinetic Energy of Hailfalls. Part I: Hailstone Spectra, Journal of Applied Meteorology, Apr. 1978, 8 pages.

Wilson et al., The Complementary Use of Titan-Derived Radar and Total Lightning Thunderstorm Cells, paper presented on Oct. 16, 2005, 10 pages.

Zipser et al., The Vertical Profile of Radar Reflectivity and Convective Cells: A Strong Indicator of Storm Intensity and Lightning Probability? America Meteorological Society, 1994, 9 pages.

* cited by examiner

SYSTEM AND METHOD FOR WEATHER DETECTION USING MORE THAN ONE SOURCE OF RADAR DATA

CROSS-REFERENCE TO RELATED PATENT APPLICATIONS

The present application is related to U.S. application Ser. No. 12/892,663, filed on Sep. 28, 2010, by Kronfeld et al., entitled "SYSTEM AND METHOD FOR WEATHER DETECTION" and U.S. application Ser. No. 12/895,426 filed on Sep. 30, 2010 by Kronfeld et al., entitled "SYSTEM AND METHOD FOR AIRCRAFT COMMUNICATIONS", assigned to the assignee of the present application and incorporated herein by reference.

BACKGROUND

The present disclosure relates generally to the field of weather detection. More particularly, the disclosure relates to weather detection using multiple sources.

Conventionally, most aircraft weather sensors do not communicate with sensors on other aircraft and thus are limited to weather detection and forecasting using a single sensor. Although onboard aircraft weather sensors are generally capable, accuracy in the assessment of weather threat severity and extent can be increased by using multiple sensor observations. Single weather sensors can also have a limited range of weather detection.

Weather observations and ground infrastructure are conventionally limited or non-existent over oceans and over less developed countries. Aircraft having weather observation sensors can be used to detect and share weather observations with other aircraft and with facilities on the ground. However, even though weather observations can be shared, sharing alone may not provide sufficient accuracy to be useful to aircrew or realize the maximum useful potential if the shared weather observation information is simply relayed.

There is a need for an improved system for and method of providing multiple weather sensor observations. There is also a need for a system and method that increases accuracy of weather threat assessment, extent, and/or detection range. Yet further, there is a need for an efficient system for and method of combining radar data from multiple sources. There is further need for a system for and method of increasing the range of weather detection onboard an aircraft. Further still, there is a need for a system for and method of providing increased weather observation over oceans and less developed countries. There is further still a need for a system for and method of increasing accuracy of shared weather observations. There is also a need for a system and method of increasing the useful potential of shared weather observations.

SUMMARY

An exemplary embodiment relates to a radar system including electronics. The electronics can be configured to receive communications from a terrestrial location. The communications include composite weather data from a plurality of sources and scheduling data. The scheduling data includes an indication of timing for sending local weather data sensed by an airborne radar system to the terrestrial location.

Another exemplary embodiment relates to a terrestrial system. The terrestrial system includes electronics for receiving aircraft radar data and terrestrial weather data. The electronics provide composite weather data which comprises weather elements selected from the aircraft weather data and the terrestrial weather data based at least in part upon certain factors. The certain factors can include at least one of: distance of weather to a radar sensor, timing of sensing data, type of weather activity, quality of radar data, flight track, or cell growth.

Another exemplary embodiment relates to a method providing a map including indications of weather for an aircraft. The method includes receiving radar return data from at least two sources. At least one source is an airborne source. The radar return data from the airborne source is received using at least one wireless communication channel. The method also includes providing composite data for use by the aircraft. The composite data represents the map. The composite data includes elements from each of the two sources.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present disclosure will become apparent from the following description, appended claims, and the accompanying exemplary embodiments shown in the drawings, which are briefly described below.

DETAILED DESCRIPTION

Figure 1:
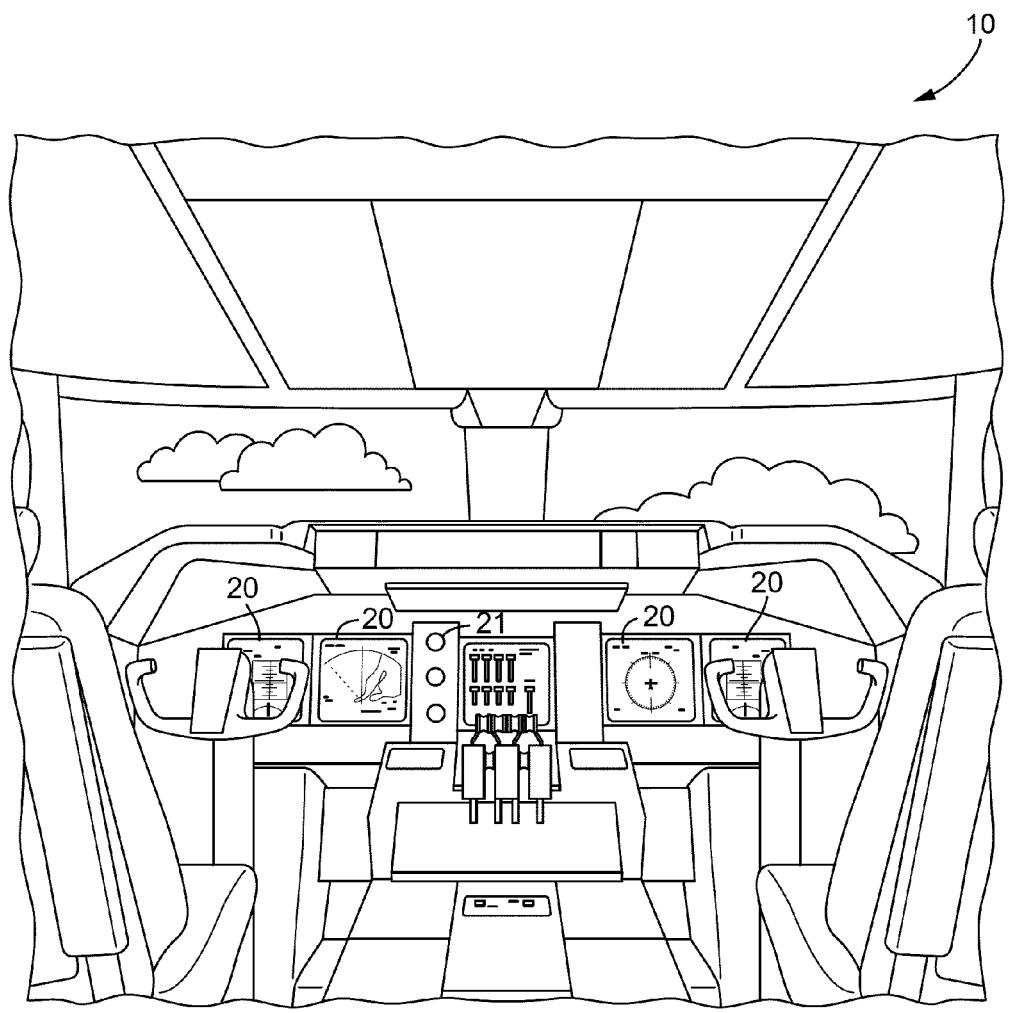
FIG. 1 is a perspective view schematic of an aircraft control center or cockpit, according to an exemplary embodiment.

Before describing in detail the particular improved system and method, it should be observed that the invention includes, but is not limited to a novel structural combination of conventional data/signal processing components and communications circuits, and not in the particular detailed configurations thereof. Accordingly, the structure, methods, functions, control and arrangement of conventional components software, and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

Referring generally to the figures, a system and method for accumulating or gathering weather information (e.g., weather radar data) from the one or more aircraft and/or ground stations is shown. The weather detection system or method can more completely calculate a location of weather based on the multiple sources. The weather data detected by the system and received from the other aircraft and ground stations may include distance of the sensor to the location, geographic reference, radar type or quality and timestamp data. The system or method can provide a more complete picture or map of weather for aircraft or other weather observers.

Advantageously, the system and method receives radar data associated with weather from more than one source. Preferably, the weather data can include elements associated with a geographic position and radar reflectivity, storm track, hazards, etc. The data can be sent via wireless and wired data links to a collection center (e.g., terrestrial center). The collected radar data can be selected, filtered and stitched into a mosaic (e.g., composite data) representing the best weather knowledge within a proximity. The radar data can be selected based upon the radar source, altitude of the aircraft, radar tilt angle and other relevant parameters. The mosaic or composite data can be sent to clients desiring better weather knowledge for route affirmation and alteration.

Based upon the amount of data received for a particular area, the collection center can advantageously send commands to the aircraft available in that area to either refresh sets of data when able or to wait for the next data request. Other weather data can be provided (e.g. from non-radar sources) and selected, filtered and stitched into the mosaic or composite data. Advantageously, the system data and method can utilize weather data from a number of aircraft in areas where ground-based weather data is not available (e.g., oceans, less developed countries, etc.).

In a preferred embodiment, the system and method can employ a protocol, algorithm or software for creating a mosaic of received data from multiple sources. Segments or elements of the received data can be selected for the resulting data based upon age of the data, weather activity detected (e.g., storm cell growth, storm severity, level of precipitation, etc.), proximity of the sensor to the area of interest, quality of the radar data (e.g., bandwidth, transmit power, elevation angle, etc.) and flight track projection and history.

In a preferred embodiment, the mosaic or composite data can be representative of an aggregate of geographically referenced received weather products which are then stored for distribution to other ground based and aircraft systems. The received data is preferably periodically received (e.g., 2 to 10 minute intervals). Aggregate products are sent up to the aircraft according to interest of the flight crew and proximity to weather events in one embodiment. The individual and aggregate products are also used to generate data request commands for aircrafts in area of interest. For example, if a storm cell is detected near an aircraft, a request for data associated with that storm cell near the aircraft may be sent to the aircraft. In addition, the scheduling of data from that aircraft may be increased so that data associated with the storm cell may be received more often.

Preferably, the system and method are optimized to reduce costs and bandwidth needs associated with communication on aircraft. Data which is too distant or contains too little information or has no apparent hazard is generally not requested. Further, the scheduling is configured so that when aircraft making identical or nearly identical observations, data from only one aircraft is chosen. In one preferred embodiment, the data can be chosen sequentially from the aircraft to spread the cost of data link costs evenly across a number of aircraft in a region of interest.

Referring to FIG. 1, the system and method can be used to provide the composite data to an aircraft control center or cockpit 10 for an aircraft 110 (FIG. 2) according to one exemplary embodiment. Aircraft control center 10 includes flight displays 20. Flight displays 20 can be used to provide information to the flight crew, thereby increasing visual range and enhancing decision-making abilities. According to an exemplary embodiment, at least one of the displays of the flight displays 20 is configured to provide an indication to a weather flight crew.

Figure 4:
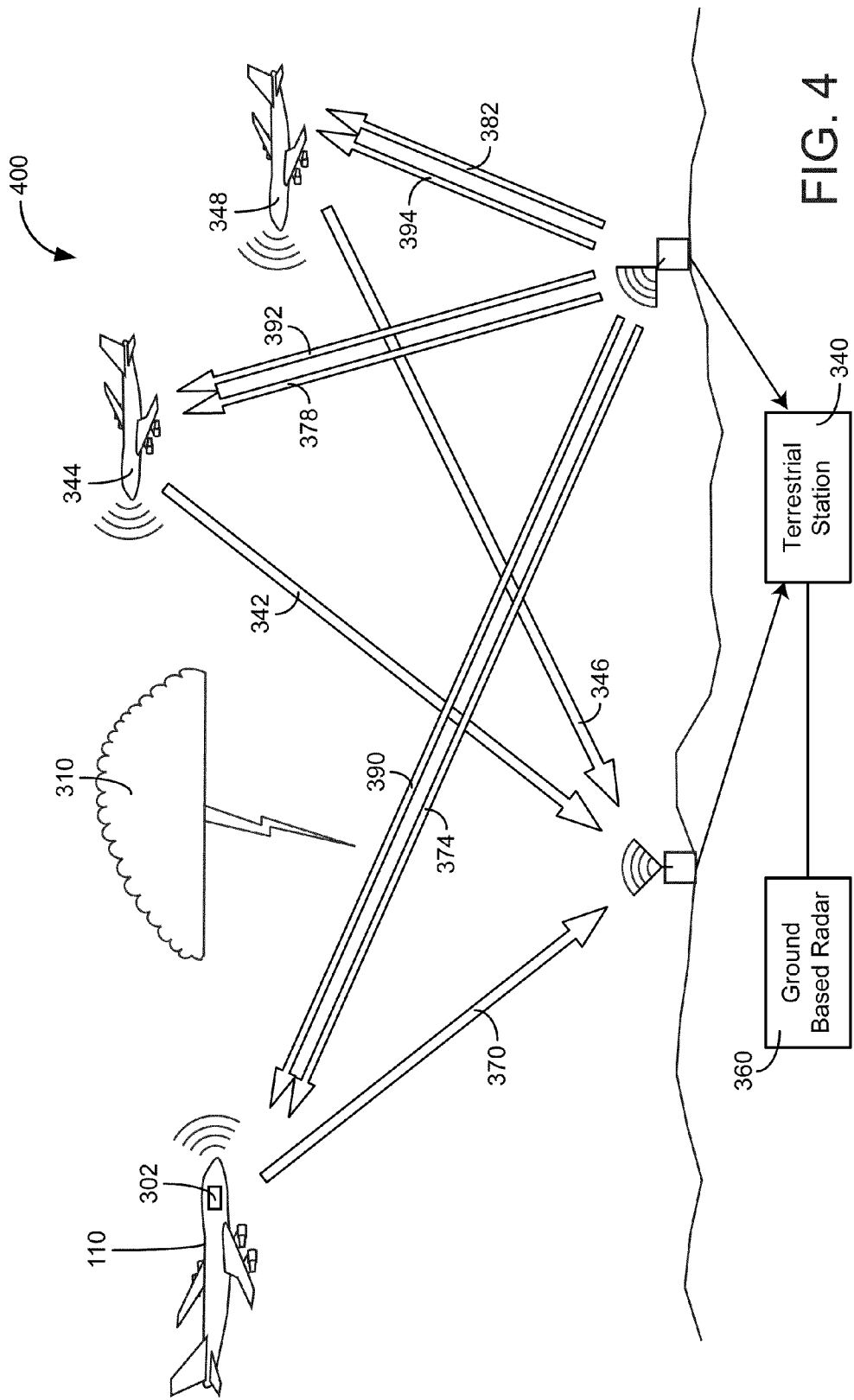
FIG. 4 is a schematic illustration of aircraft-to-aircraft radar communication and aircraft-to-ground radar communication for exchanging radar data in the weather detection system illustrated in FIG. 3 according to an exemplary embodiment.

In an exemplary embodiment, flight displays 20 can provide an output from a radar system 302 (FIG. 2) of aircraft 110 or from a weather detection system 400 (FIG. 4). Flight displays 20 can include a weather display, a joint display, a weather radar map and a terrain display. Further, flight displays 20 may include an electronic display or a synthetic vision system (SVS). For example, flight displays 20 can include a display configured to display a three dimensional perspective image of terrain and/or weather information. Other view of terrain and/or weather information may also be provided (e.g. plan view, horizontal view, vertical view, etc.). Additionally, flight displays 20 can be implemented using any of a variety of display technologies, including CRT, LCD, organic LED, dot matrix display, and others. Flight displays 20 can also include head-up displays (HUD) with or without a projector.

Aircraft control center 10 additionally includes one or more user interface (UI) elements 21. UI elements 21 can include dials, switches, buttons, touch screens, or any other user input device. UI elements 21 can be used to adjust features of flight displays 20, such as contrast, brightness, width, and length. UI elements 21 can also (or alternatively) be used by an occupant to interface with or change the displays of flight displays 20. UI elements 21 can additionally be used to acknowledge or dismiss an indicator provided by flight displays 20. Further, UI elements 21 can be used to correct errors on the electronic display.

Figure 2:
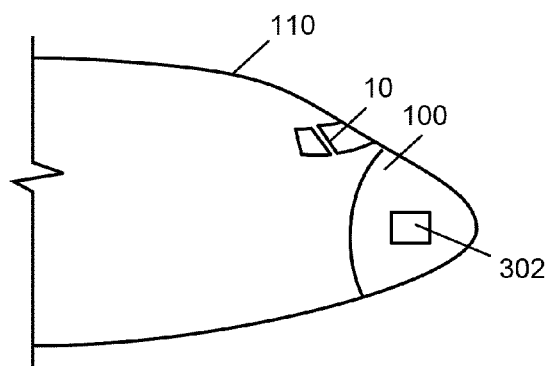
FIG. 2 is a side view schematic illustration of the front of an aircraft with an aircraft control center and nose, according to an exemplary embodiment.

Referring to FIG. 2, the front of aircraft 110 is shown with aircraft control center 10 and nose 100, according to an exemplary embodiment. Radar system 302 is generally located inside nose 100 of the aircraft or inside a cockpit of the aircraft. Radar system 302 or other equipment aboard the aircraft can be configured to receive radar data from other sources. According to other exemplary embodiments, radar system 302 can be located on the top of the aircraft or on the tail of the aircraft. Yet further, radar system 302 can be located anywhere on the aircraft. Furthermore, the various components of radar system 302 can be distributed at multiple locations throughout aircraft 110. Additionally, radar system 302 can include or be coupled to an antenna system of aircraft 110.

Figure 3:
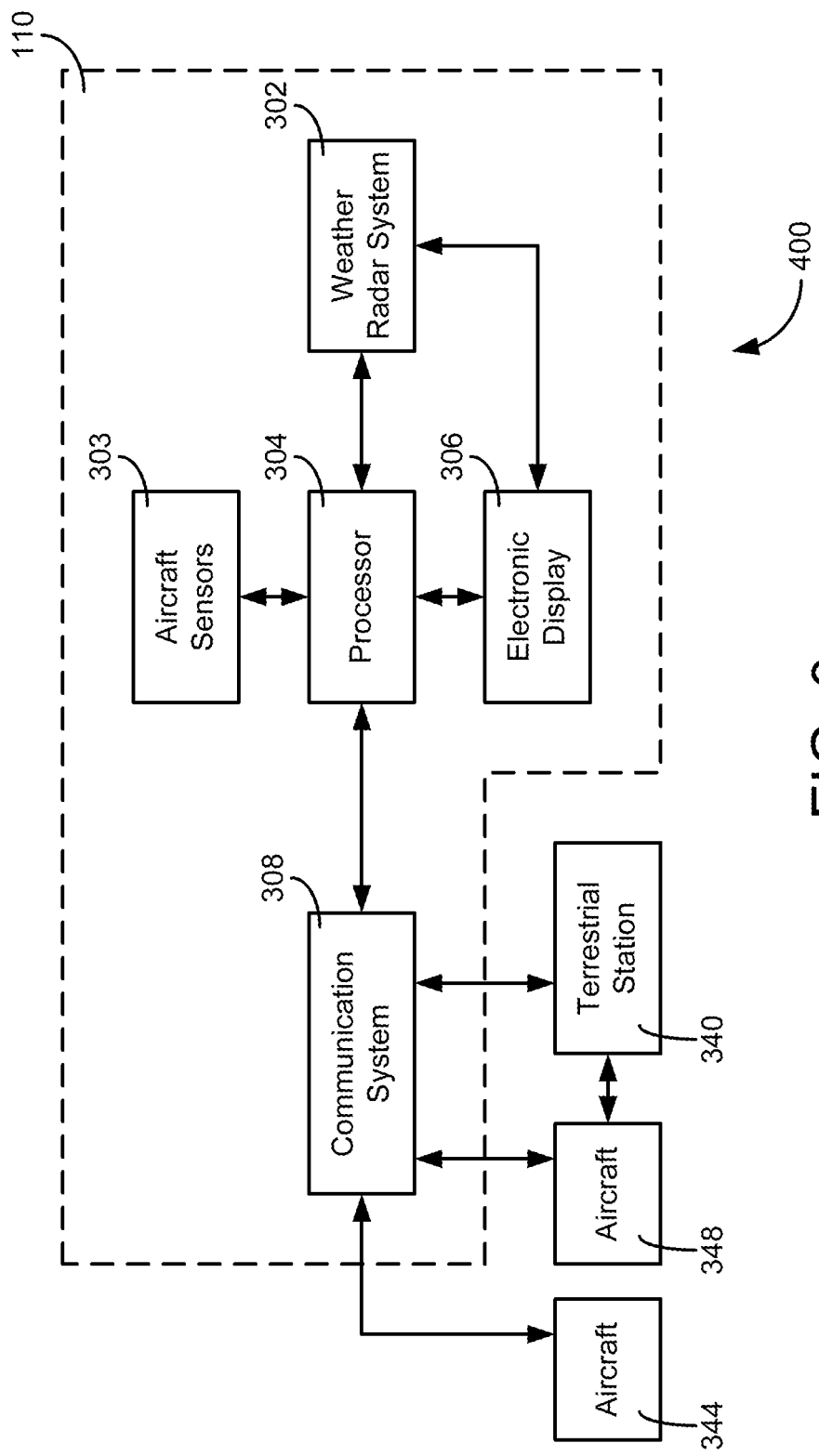
FIG. 3 is a general schematic block diagram of a weather detection system, according to an exemplary embodiment.

Referring to FIG. 3, a weather detection system 400 is shown, according to an exemplary embodiment. System 400 is shown to include a weather radar system 302, aircraft sensors 303, electronics (such as a processor 304), an electronic display system 306, and a communication system 308. System 400 can be used by aircraft 110. Weather radar system 302 is generally configured to cast one or more radar beams from an aircraft mounted antenna, to receive returns, and to interpret the returns (e.g. for display to a user, for transmission to an external weather system, etc.).

Additionally, weather radar system 302 can perform multiple radar sweeps. The radar sweeps can include horizontal sweeps, vertical sweeps, or a combination of horizontal and vertical sweeps. Furthermore, the radar sweeps can be performed such that they are substantially orthogonal to one another. According to other exemplary embodiments, weather radar system 302 can be a monopulse radar system, a sequential lobing system, or a radar system with an aperture capable of switching modes. According to various exemplary embodiments, weather radar system 302 may also include at least one of a lightning sensor, a turbulence sensor, a pressure sensor, etc. that may be used to monitor weather and detect lightning, convective cells, clear air turbulence, etc.

Weather radar system 302 can be a system for detecting weather patterns. Detected weather patterns can be communicated to electronic display system 306 for display to the flight crew. In addition, composite data from station 340 can be displayed on display system 306. Detected weather patterns may instead or may also be provided to electronics or processor 304 for further analysis or transmission to a ground-based data center or terrestrial station 340 or another aircraft 344, 348 (FIG. 4) via communication system 308.

Station 340 may direct the aircraft 110, 344, 348 via communication system 308 to scan in specific areas to improve detection accuracy of weather. Alternatively, system 302 may request that station 340 and aircraft 344, 348 direct a scan towards weather of interest to aircraft 110 (e.g., in the flight path) to improve detection accuracy of the weather. The scans performed by radar system 302 and the requests may be transmitted to station 340 or another aircraft 344, 348 via communication system 308.

Aircraft sensors 303 may include one or more lightning sensors, turbulence sensors, optical systems (e.g., camera system, infrared system), or any other aircraft sensing systems. Data from aircraft sensors 303 can be output to processor 304 for further processing or for transmission to other aircraft 344, 348, or to station 340 via communication system 308.

Referring to FIG. 4, weather detection system 400 is shown in greater detail according to an exemplary embodiment. As described above, system 400 can include weather radar system 302 aboard aircraft 110, and ground based data center or terrestrial station 340. Ground based data center or terrestrial station 340 can receive radar data via a channel 342 from aircraft 344 and radar data from a channel 346 from an aircraft 348. System 400 can utilize data and communications from more than three aircraft even though only three aircraft are shown in FIG. 4.

Additional data can be received from ground based radar 360 from a wireless or wired channel. In addition to receiving radar data on channels 342 and 346, ground base data center 340 can receive radar data on a channel 370 associated with aircraft 110.

The radar data can be in a number of forms. Preferably, the radar data includes location information and time of sensing information. The radar data can also include radar characteristics associated with the radar used to provide the radar data. The characteristics can include an indication of band-type, radar quality, tilt angle, etc. In one embodiment, station 340 may adjust radar for its particular bands so that comparisons and selection of data is consistent. For example, S band radar information can be converted into X band radar information and C band radar information can be converted into X band information. Preferably, center 340 utilizes an X band version of radar information associated with aircraft 110, 344 and 348. For example, S band has a longer wave length so it is less attenuated than X band systems.

The ground base data center or station 340 can provide mosaic data, aggregated data or composite data to aircraft 110 via a channel 374 to aircraft 344 via channel 378 and to aircraft 348 via channel 382. Station 340 can also provide scheduling data and other control data to aircraft 110 via a channel 390, to an aircraft 344 via a channel 392, and to an aircraft 348 via a channel 394.

Various types of channels can be utilized including virtual channels, radio channels, satellite channels, etc. The channels can be bi-directional or uni-directional. Channels can be satellite link channels, switch 74 channels, VHF channels, IMR-SAT channels, etc. Any type of wireless communications can be utilized. Various types of communication protocols, including network and ad hoc network protocols can be used to perform communication operations and establish the channels in FIG. 4. Channels can also be formed as described in U.S. patent application Ser. Nos. 12/892,663 or 12/895,426.

In operation, system 400 observes weather 310 via onboard radar such as radar system 302 associated with aircraft 110, and radar systems associated with aircraft 344 and 348. Each aircraft 110, 344, and 348 provides radar data to ground base data center 340 wirelessly. Station 340 can receive additional weather related data such as additional radar data via wired or wireless connections, including but not limited to, Internet connections. Station 340 processes the data and can form mosaic weather data for use onboard each of aircraft 110, 344 and 348. Advantageously, system 400 can take advantage of the number of radar units already available in airborne systems to achieve a comprehensive view of weather in the atmosphere.

The mosaic data can be the same for each aircraft 110, 344 and 348 or optimized for the specific location associated with aircraft 110, 344 and 348. In addition, control data for each of aircraft 110, 344 and 348 can be provided so that additional radar data is provided at the appropriate time for station 340. In general, each aircraft 110, 344 and 348 in the proximity of the location of weather 310 can make an independent observation. The use of observations from different locations allows weather 310 to be observed from different sides, thereby giving a more complete picture of weather 310.

In addition, each aircraft 110, 344 and 348 can provide hazard information associated with weather 310. Hazard information can be information related to weather phenomena, including but not limited to, hail, lightning, wind shear, turbulence, etc. Station 340 preferably aggregates the weather and the hazard data and provides a mosaic of the weather and hazard data.

System 340 also utilizes the weather and hazard data to issue commands across control channels 390, 392 and 394. The commands can request radar data for particular locations and set times and schedules for radar scans. Station 340 may schedule less weather observations when there is low severity of weather detected in one embodiment. Clear blue skies may indicate that additional scans may not be necessary at as high a frequency. Further, particular types of hazard, such as hail, turbulence, lightning, etc., can warrant increased scheduling of weather observations. In one embodiment, if one of aircraft 110, 344, or 348 detect a growing or decaying cell, a lightning hazard, or hail, turbulence, or other hazard, radar observations are scheduled for that location at a high frequency. As weather severity and changes in weather increase, higher rates of weather observation can be scheduled (e.g., 5 minutes to 1 minute) in one embodiment.

Figure 5:
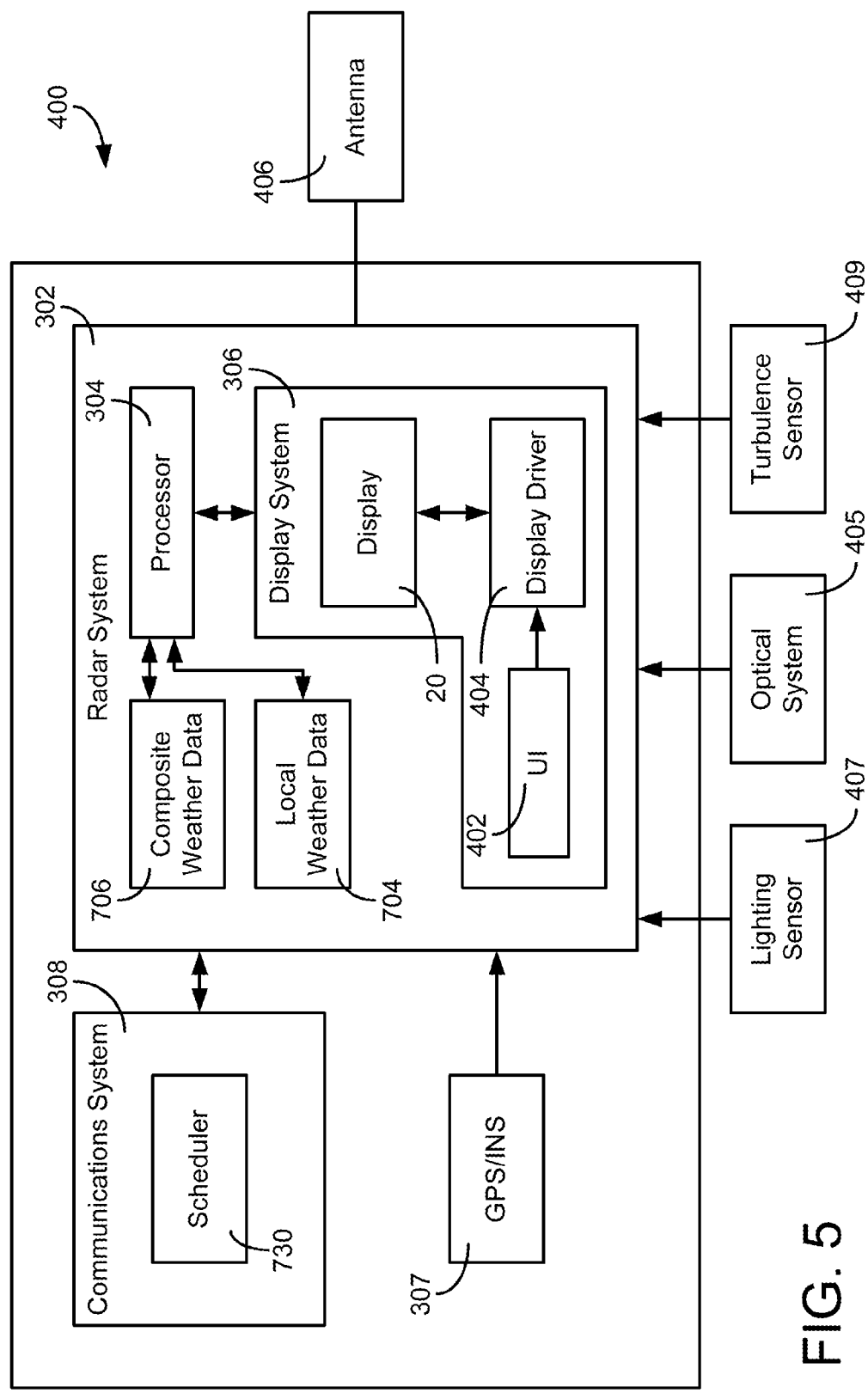
FIG. 5 is a general block diagram of an aircraft radar system for use in the weather detection system illustrated in FIG. 3 according to a further exemplary embodiment.

With reference to FIG. 5, weather radar system 302 for use in system 400 includes electronics or processor 304, a local weather data memory 704, a composite data memory 706 an electronic display system 306, and a communication system 308. System 300 also includes a GPS/INS system 307 configured to provide location data of aircraft 110 to electronics 304.

Electronic display system 306 can be used to display information from weather radar system 302 or other electronic equipment. Electronic display system 306 can include user interface (UI) elements 402, display 20, and a display driver 404. Display driver 404 can be any computer hardware and/or software that enables electronic display system 306 to communicate with and receive data from various other components. UI elements 402 can be used for selection of data shown on display 20 or to apply corrections to data shown on display 20. For example, For example, UI elements 402 may be used to select specific or appropriate data corresponding to a weather scan request for transmission to weather system 302. Input received from UI elements 402 is processed by display driver 404. Display driver 404 may communicate the received input to electronics 304 or various other components. Although shown as parts of system 302, UI elements 402, display driver 404 and display 20 can be separate components or part of other systems on aircraft 110.

Weather radar system 302 may be used to detect weather patterns in the vicinity of the aircraft 110, such as reflectivity, stormtops, turbulence, lightning, hail, etc. Weather radar system 302 can provide weather related information to electronic display 306 and/or electronics 304. Weather radar system 302 can be coupled to an antenna 406 via a transceiver. The transceiver can be configured to transmit radar signals via antenna 406 and to receive radar returns via antenna 406.

Antenna 406 can be used to perform a radar sweep for detecting weather information. In addition to use for weather detection, antenna 406 can also receive return signals from ground/terrain features. The tilt of antenna 406 can be controlled thereby enabling multiple steered radar sweeps to be cast at multiple tilt angles. For example, antenna 406 may be directed specifically towards a region of interest between normal radar scans of the surrounding area. The airborne radar data collected from radar system 302 can be downlinked to station 340 to improve weather observations and forecasts.

Weather radar system 302 may be any automatic radar, for example as commercially available from Rockwell Collins, Inc. of Cedar Rapids, Iowa. Such automatic radars may have several advantages as a source of data to fill in gap regions around ground radar sites. Automatic radars have standardized antenna patterns, standardized ground clutter rejection algorithms, and the ability to interrupt normal horizontal antenna sweeps with configurable auxiliary antenna sweeps in either elevation or in azimuth. These characteristics may be advantageously used to support the ground radar data gathering process.

Weather radar system 302 preferably can be a Rockwell Collins Multi-Scan™ weather radar system that can produce various data sets of products internally that contain the information about the atmosphere. The data can include horizontal and vertical wind information, windshear information, now cast weather, de-cluttering boundaries, storm cell tracking, observation history, echo tops and vertical integrated liquid (VIL). Now cast weather is a prediction of weather (e.g., cell height, vertical extent, horizontal wind, vertical wind, location and threat level) based upon observation history. Preferably, system 302 scans the atmosphere in front of the aircraft about every 8 to 10 seconds. The products produced in the Multi-Scan™ radar are collected, compressed and sent via an air to ground data link to a ground station 340. Station 340 stores the data received from all participating aircraft (e.g., aircraft 310, 344 and 348) and can also use data from ground based radars (e.g., radar 360) such as radar systems of the National Weather Systems (e.g., the NEXRAD system).

System 302 also includes a GPS/INS system 307, an optical system 405, a lightning sensor 407, and a turbulence sensor 409. GPS/INS system 307 is configured to provide positional information regarding the aircraft. For example, location, speed, displacement information, g-loading for turbulence detection, etc. Optical system 405 may be a camera system for detecting lightning or storm tops, an infrared imaging system for detecting turbulence, storm tops, or volcanic clouds, or any other optical system. Lightning sensor 407 may be any lightning sensor or detector configured to detect at least one of cloud-to-cloud and cloud-to-ground lightning strikes and capable of being mounted for use on an aircraft. Lightning sensor 407 may generally provide a good azimuth measurement of lightning strikes. Turbulence sensor 409 may be any direct or indirect/inferred turbulence sensor or sensing system configured to detect or infer areas of increased turbulence. For example, turbulence sensor 409 may use infrared and/or LIDAR technology for sensing.

Processor 304 may be any hardware and/or software processor or processing architecture capable of executing instructions and processing radar returns, lightning data, and/or turbulence data. For example, processor 304 may be configured to examine return data from antenna 406, thereby determining regions of weather activity. Processor 304 may also be used to send electrical signals to antenna 406 in order to tilt antenna 406 and steer a radar sweep. Further, processor 304 may be configured to construct a weather radar map based upon radar returns. The constructed weather radar map may be output to processor 304 for further analysis or transmission to station 340 or aircraft 344 and 348. The composite weather radar map may instead or may also be output to electronic display system 306.

The composite weather data or radar data can be stored in memory 706. Local weather data or radar data can be stored in memory 704. The weather data can also include hazard data.

Processor 304 may be configured to verify data received from radar system 302 or to facilitate transmission of weather data to and from station 340 or other aircraft 344 and 348 via communication system 308. Processor 304 can include a digital signal processor and a memory. The processor may be any hardware and/or software processor or processing architecture capable of executing instructions (e.g., computer code stored in the memory) and operating on various data types. The memory may be any volatile or non volatile memory configured to store instructions or operations for execution by processor 304. Alternatively, the memory may be configured to store weather data received from communication system 308 or from radar system 302.

Processor 304 may receive time-stamped weather information from sensors on aircraft 344 and 348 and/or ground station 340 to triangulate more accurate positions of weather threats. This may provide accurate detections of weather phenomena that were not previously available without airborne networked communications. Accurate detections may allow refinement of weather threat object severity and extent.

Processor 304 may be able to determine weather or terrain types and location using radar range information, azimuth information, and elevation information provided by weather radar system 302. For example, electronics 304 may determine the presence of a convective cell due to radar data indicating high reflectivity or turbulence. Processor 304 may gather radar data from aircraft 344 and station 340 via communication system 308 to more accurately identify and locate convective cell information. Turbulence and wind information may be detected via Doppler processing from the multiple weather radar systems. In addition, timestamped reflectivity information can be correlated from multiple weather radars for improved threat assessment. For example, threat assessment for storm tops can be refined from multiple measurements on the same storm by multiple radars (e.g., system 300, one or more aircraft 344 and 348, a ground station 340, a combination thereof, etc.).

Processor 304 may also be configured to determine weather types and location using turbulence information provided by weather radar system 302. For example, electronics 304 may determine the presence of a convective cell due to turbulence measurements by sensor 409. Infrared and LIDAR location measurements of atmospheric phenomena such as turbulence can be improved through the use of correlated single sensor observations. Electronics 304 may gather turbulence data from aircraft 344, 348 and station 340 via communication system 308 to more accurately identify and locate convective cell information.

Processor 304 may further be configured to determine weather types and location using lightning strike information provided by weather radar system 302. For example, processor 304 may determine the presence of lightning or a convective cell due to lightning strike measurements by sensor 407. Processor 304 may gather lightning data from aircraft 344 and 348 and system 340 via communication system 308 to more accurately identify and locate lightning and convective cell information. Information from airborne lightning detector 407 provides a good azimuth measurement to a lightning strike, but does not provide a good range measurement. If lightning information is shared between system 300 and multiple aircraft 344 and 348 or with system 340 along with an accurate timestamp, then a higher accuracy lightning detection map can be generated using time of arrival techniques that triangulate, trilaterate, or multilaterate the position of lightning using multiple observations. Processor 304 may be used as the centralized processor to aggregate lightning strike information for the triangulating processing of the lightning strike. In other exemplary embodiments, electronics on aircraft 344, 348 or system 340 may be used for processing. The output of the processing may be a position of the lightning strike, for example latitude and longitude. If an additional fourth measurement is detected, the altitude of the lightning strike may be determined.

Communication system 308 is configured to establish a datalink (e.g., channels 370, 374 and 390 to station 340) with aircraft 344, 348 and/or station 340. Communication system 308 is configured to transmit weather data from radar system 302 to station 340 or aircraft 344, 348 and to receive weather data or a scan requests from station 340 or aircraft 344, 348. Communication system 308 includes a wireless communication interface configured to facilitate communication between weather system 302 or aircraft 110 and center 340. Wireless communication interface may be any interface capable of sending and receiving data using a radio frequency (RF) signal.

According to one embodiment, system 308 includes a scheduler 730. Scheduler 730 receives control data from station 340. The control data is processed and provided to processor 304 for scheduling radar scans according to the control data.

Communication system 308 may also include electronics configured to filter, parse, encrypt, or prepare data into an appropriate format for transmission. For example, if electronics are providing weather data from a scan of a region by radar system 302 for transmission to station 340 or aircraft 344, 348, processor 304 may convert the data into a format suitable for transmission. System 308 may also be configured to assemble, decrypt, or otherwise analyze data received by system 308 for use by processor 304. For example, if system 302 receives a signal directing the aircraft to scan a region, system 308 may provide the signal to processor 304 in a format that it can process.

It is noted that while the Figures illustrate direct communication with weather system 302 and aircraft 344 and 348, according to other exemplary embodiments, communication may be routed via one or more satellites or other third party relays within the line of sight of the aircraft. The data transmitted by system 308 may include any combination of azimuth, angle, and range data for use in determining more accurate locations of weather phenomena.

Station 340 can be part of any ground based or airborne electronic system configured to map weather using both ground radar and aircraft radar (e.g., a 4-D weather cube). Station 340 receives weather data from one or more ground radar systems 360 to generate an atmospheric coverage map. Data may be received from radar systems 360 via satellite communication, a hardwired network connection, via the Internet, a wireless network, or any other suitable means.

Figure 6:
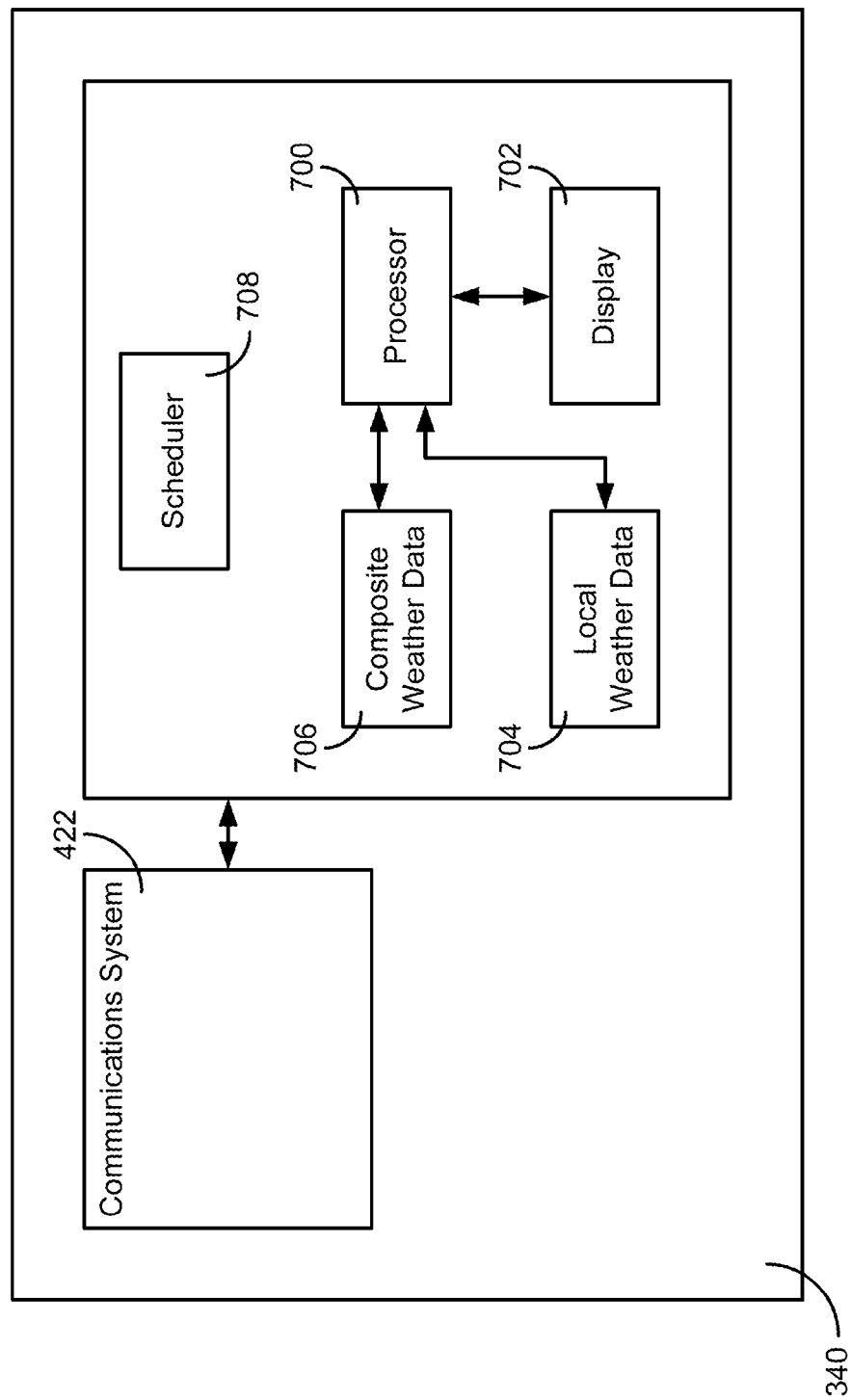
FIG. 6 is a general block diagram of an aircraft radar system for use in the weather detection system illustrated in FIG. 3 according to a further exemplary embodiment.

With reference to FIG. 6, station 340 for use in system 400 includes a wireless communication system 422. Wireless communication system 422 may be similar to communication system 308 and is configured for transmitting weather data or weather alerts from ground radar systems 360 and/or aircraft radar systems to aircraft 110, 344 and 348. Communication system 422 is also configured to provide signals to aircraft 110 to direct radar scans of weather regions for increased accuracy. Communication system 422 is further configured to receive weather data from aircraft 110, 344 and 348 and radar 360 for building a weather coverage map.

Station 340 includes a processor 700, display 702, a local weather database 704, a composite weather database 706 and a schedule 708. Processor 700 receives weather data from system 360 and aircraft 344, 348 and 110 and builds composite weather data in composite weather database 706. Processor 700 can display such composite weather data on display 702 as well as individual local weather data. Processor 700 communicates with a scheduler 708 to provide control information to aircraft 110, 344 and 348 to schedule transmission of radar data. Data is received by communications system 308 of aircraft 110 and can be used in scheduler 708 onboard aircraft 110 so that processor 304 can control system 302 to provide the appropriate radar data back to station 340. Scheduler 708 can be part of processor 700.

Composite weather data generated by processor 700 can utilize two or more radar sources. Generally, the composite weather data is a mosaic of received data. The mosaic can be configured in a multilayer format. The received data is preferably received at frequencies of approximately 2 to 10 minute intervals.

The mosaic data is selected by selecting segments of received data based upon age of data, weather activity detected (e.g., storm cell growth, etc.), proximity to area of interest, quality of radar data (e.g. beam width, transmit power, elevation angle, etc.), flight projection and history. The radar data can be converted to accommodate alterations associated with different types of radar (X-band, C-band, S-band, etc.). The provided weather elements are aggregated geographically stored in a composite weather data memory 706 for distribution to aircraft 110, 344 and 348 as well as other entities interested in weather. Local weather data 704 can be stored in a local memory 704.

In one embodiment, the composite weather data can be radar data or a combination of radar data and other data, such as hazard data. Further, the weather data can be processed weather data.

Portions of the composite weather data can be sent to aircraft 110, 344 and 348 in one embodiment. The portions can be sent according to interest in the flight crew and proximity to weather events. The individual and aggregate products are used to generate data request commands for aircraft and areas of interest. Generally, to save money and communication overhead associated with ground-to-aircraft links, data which is too distant, contains little new information, or has no apparent hazards is generally not requested. If several aircraft are making nearly identical observations, processor 700 chooses specific aircraft to spread the cost of data usage across a number of aircraft.

Advantageously, the use of additional radar sources allows aircraft 110 to see beyond envelopes its radar ranges by using system 400. Station 340 can request additional views of weather based upon the type of hazard. For example, as threat levels increase for weather hazards, additional scans of the weather hazard may be requested via channels 390, 392 and 394. For example, rate may be increased from a sample every 20 minutes to a sample of every 3 minutes based upon a type of weather situation. In addition, scheduling may be affected by geographic regions, for example, regions such as intertropical convergence cells may require additional scanning. Accordingly, as aircraft 110, 344 and 348 are in an intertropical convergence zone, station 340 may request additional scans (for example, as often as every 5 or 10 minutes).

Figure 7:
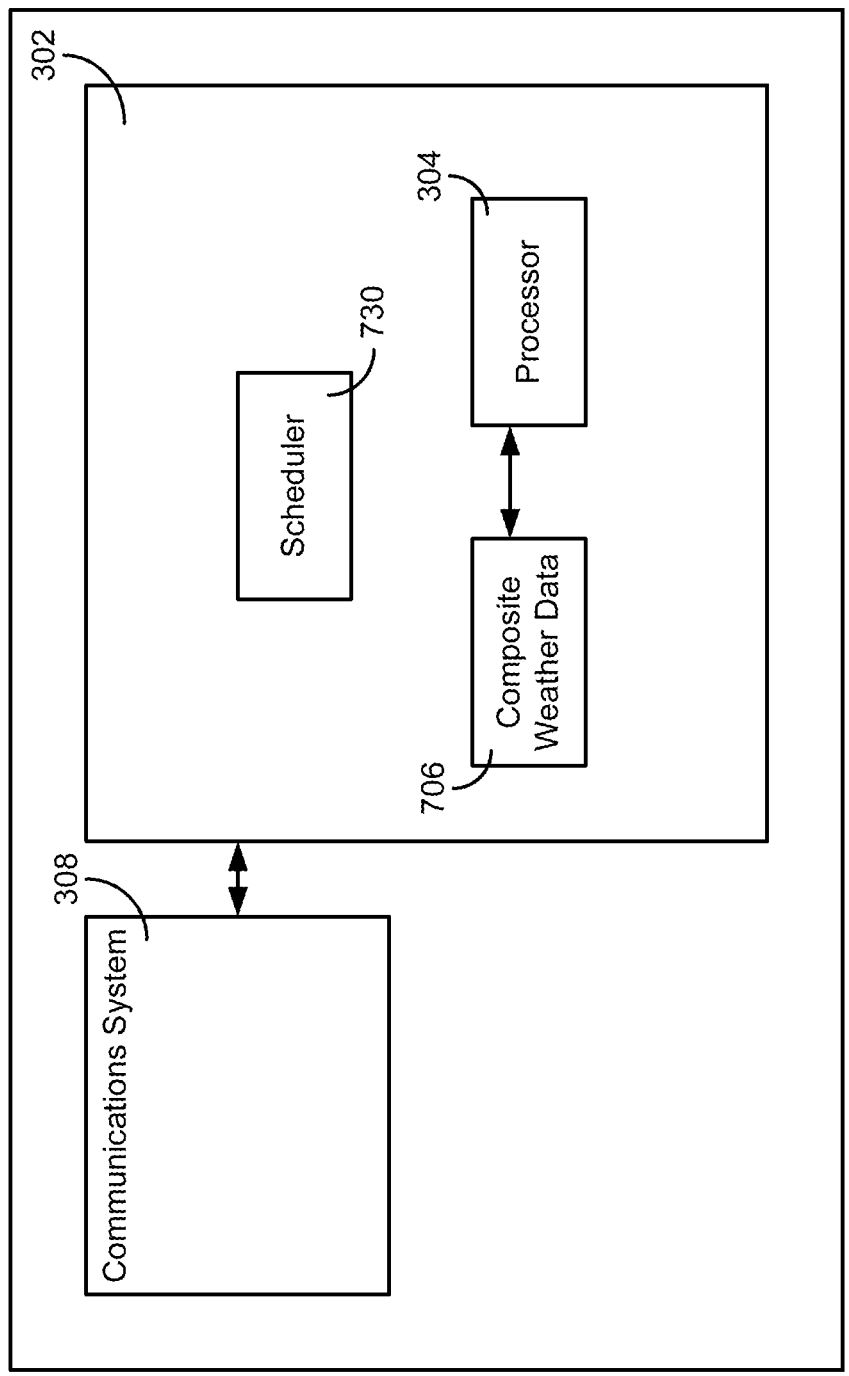
FIG. 7 is a general block diagram of a ground station for use in the weather detection system illustrated in FIG. 3 according to an exemplary embodiment.

With reference to FIG. 7, system 302 includes a substantially similar system to system 302 described with reference to FIG. 5. However, scheduler 730 is provided as part of radar system 302 as opposed to communications unit 308.

With reference to FIGS. 5 and 7, processor 304 receives the composite weather data through communication system 308 and stores composite weather data. Processor 304 can then further mix the composite weather data with local weather data before displaying on display 20 associated with system 302 in one alternative embodiment.

Figure 8:
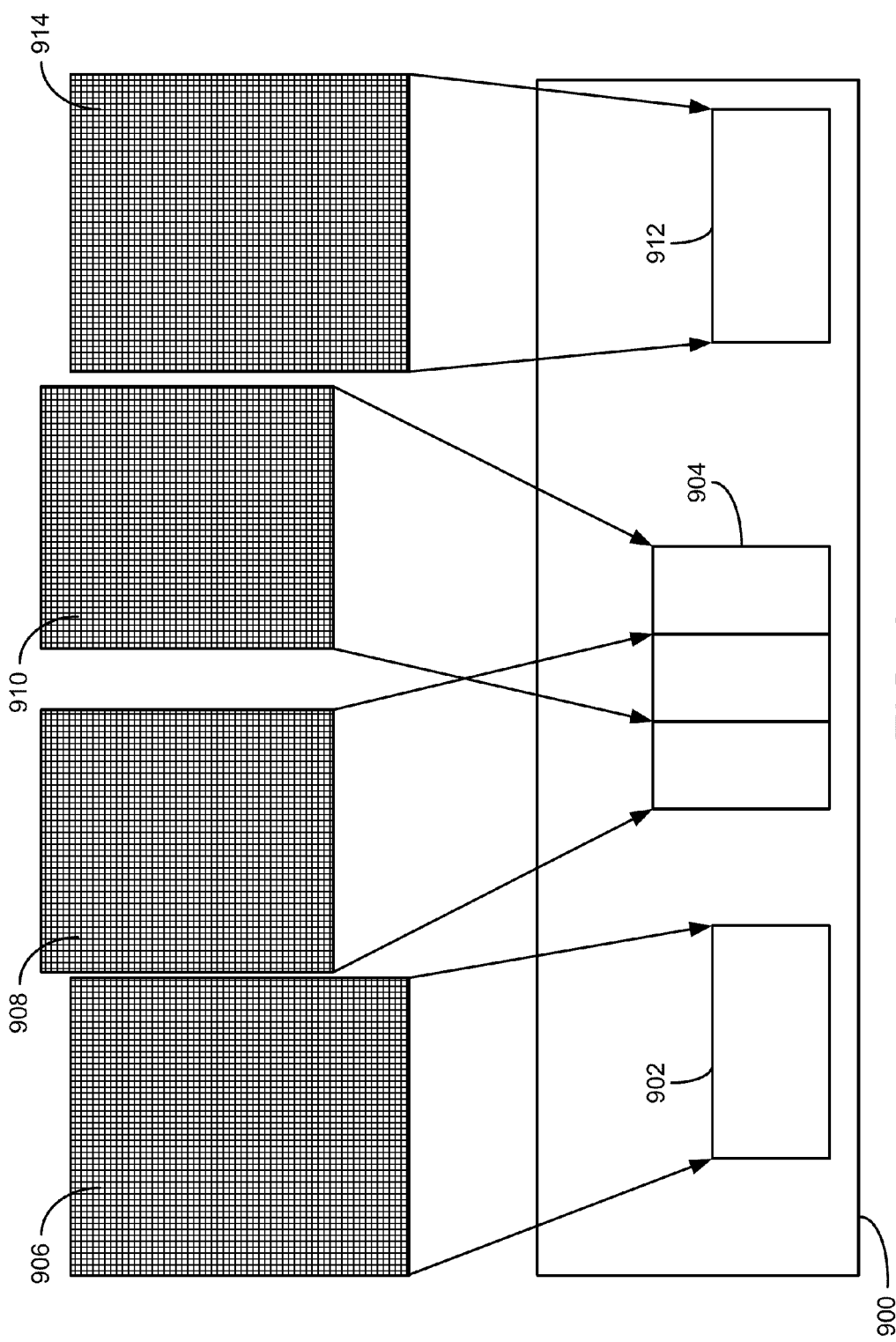
FIG. 8 is a schematic illustration of composite weather radar data from multiple sources, according to an exemplary embodiment.

With reference to FIG. 8, composite weather data 900 can include a portion 902 from a source 906, a portion 904 from a first data source 908 and a second data source 910, and a portion 912 from a data source 914. For example, source 906 can be aircraft 110, source 908 can be from aircraft 344 and source 910 can be from aircraft 348. Source 914 can be from radar 360. Sources 906, 908, 910 and 914 can be airborne or non-airborne sources (e.g., satellite or ground radar).

Portion 904 can utilize portions from source 908 and 910 which are not intersecting and directly select elements. However, where an intersection of portions 908 and 910 occurs, a selection algorithm can be utilized. The selection algorithm can choose each element based upon its relative weather severity. For example, elements which indicate a more severe weather are chosen as opposed to less severe weather elements. Alternatively, weather elements can be chosen based upon their altitude (e.g., those closer to the altitude for the particular aircraft are chosen over elements that are at an altitude farther away from the aircraft.) Alternatively, elements can be chosen based upon the age of the data, the known accuracy of the radar or the closeness of the radar to the geographic location associated with the element.

Alternatively, aircraft 110 can receive composite data and then further selects data from its local observation. In this system, the local observation data may be utilized directly as it indicates the closest and most relevant altitude observations.

Composite weather data 900 can be displayed on display 20 using colors to signify weather severity and hazards. Colors of red, orange, and green can be utilized for standard precipitation levels. Grey can be used to indicate portions for which a weather observation is not available (e.g., no radar data available for that area). Black can be used to indicate a lack of precipitation. Alternative colors or symbols can be utilized.

Figure 9:
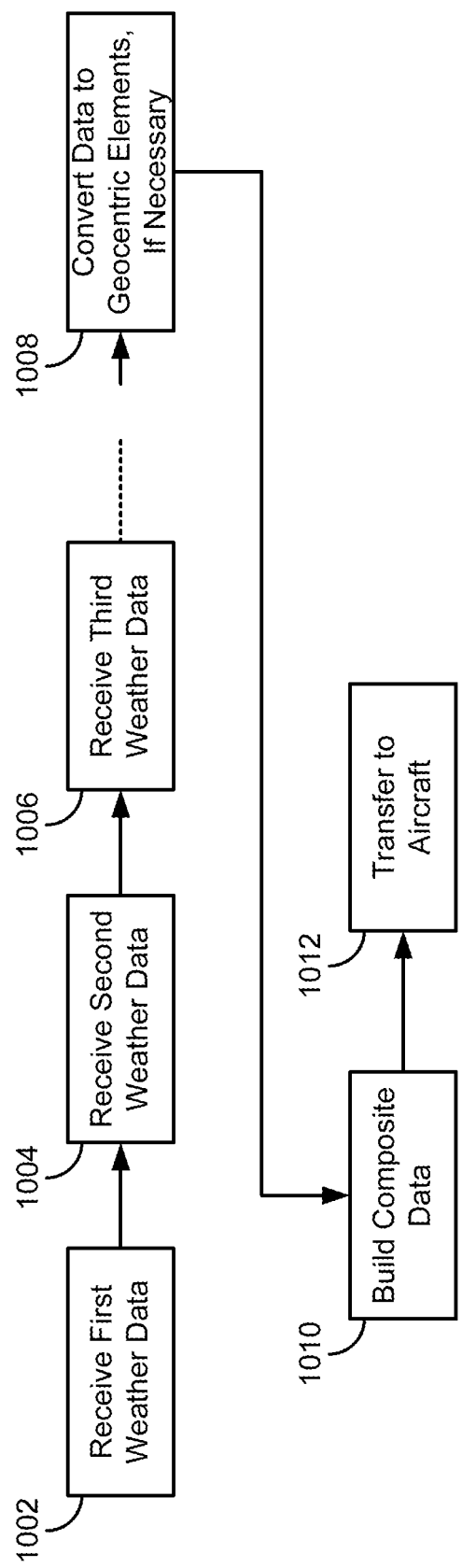
FIG. 9 is a process flow diagram of a method of gathering data from multiple radar sources, according to an exemplary embodiment.

With reference to FIG. 9, a flow diagram for the operation of system 400 is shown. At a step 1002, first weather data is received. At a step 1004, second weather data is received. At a step 1006, third weather data can be received. Alternatively, additional weather and sensor data may be received.

At a step 1008, the weather data is converted into geocentric elements if necessary. At a step 1010, composite data is built. At a step 1012, composite data is transferred to the aircraft 110. When composite data is transferred to aircraft 110, control data can be provided which requests updates of data and data from particular areas observed by aircraft 110.

Figure 10:
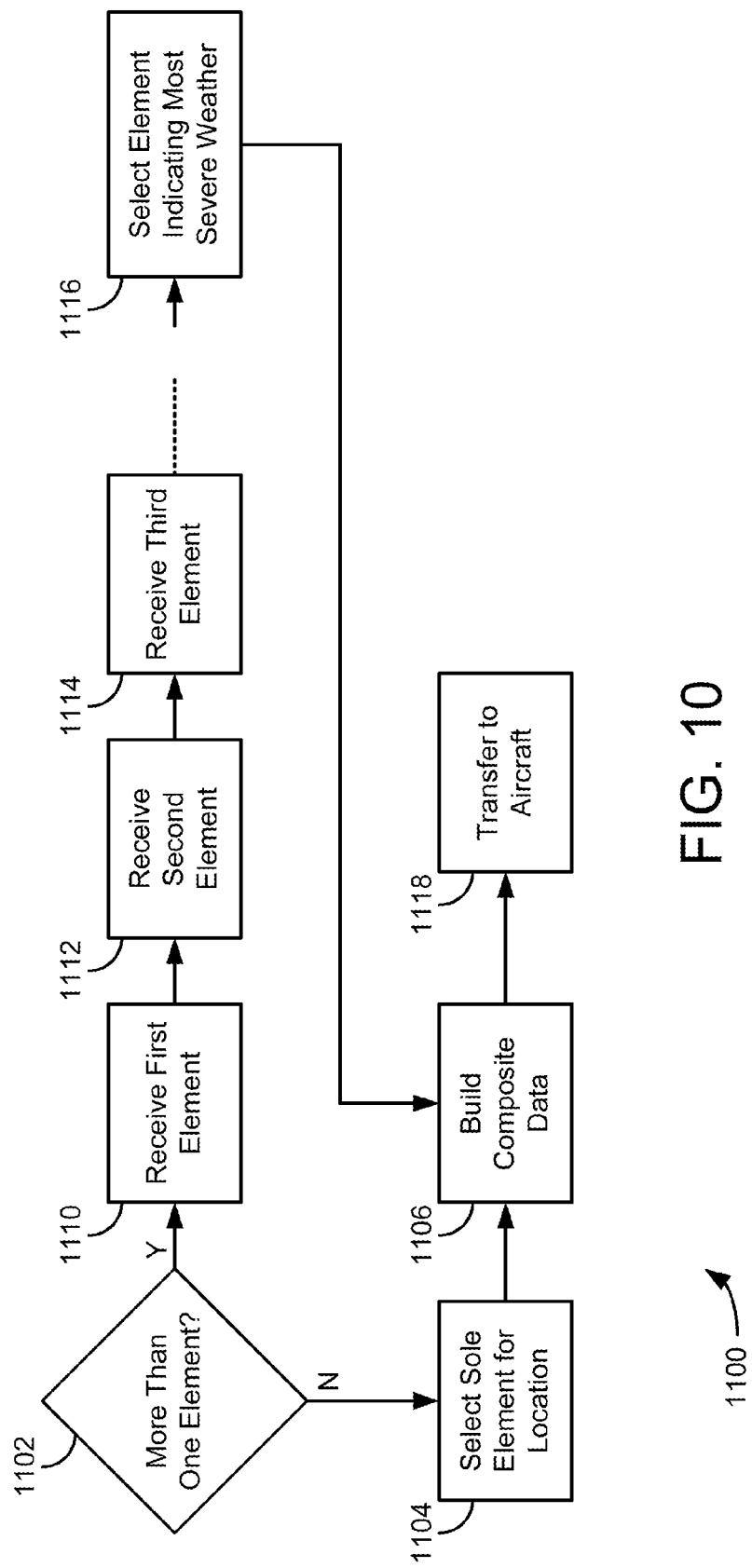
FIG. 10 is a process flow diagram of a method of selecting data from radar sources, according to a further exemplary embodiment.

With reference to FIG. 10, a process 1100 is described for filling mosaic data by selecting elements for mosaic data such as mosaic data 900. At a step 1102, a determination is made if more than one element is available from the variety of sources. If more than one element is not available, the sole element for that location is selected and used to build composite data. If selected at a step 1104, the data is used to build composite data at a step 1106. If not, two or more elements are received in steps 1110, 1112 and 1114. The element that indicates the most severe element is selected in a step 1116 and used to build composite data at step 1106. At a step 1118, the composite data is transferred to aircraft 110. The composite data can be used to refine existing weather models and generate new forecasts. The composite can also be used by terrestrial stations to refine existing weather models and generate new forecasts.

Figure 11:
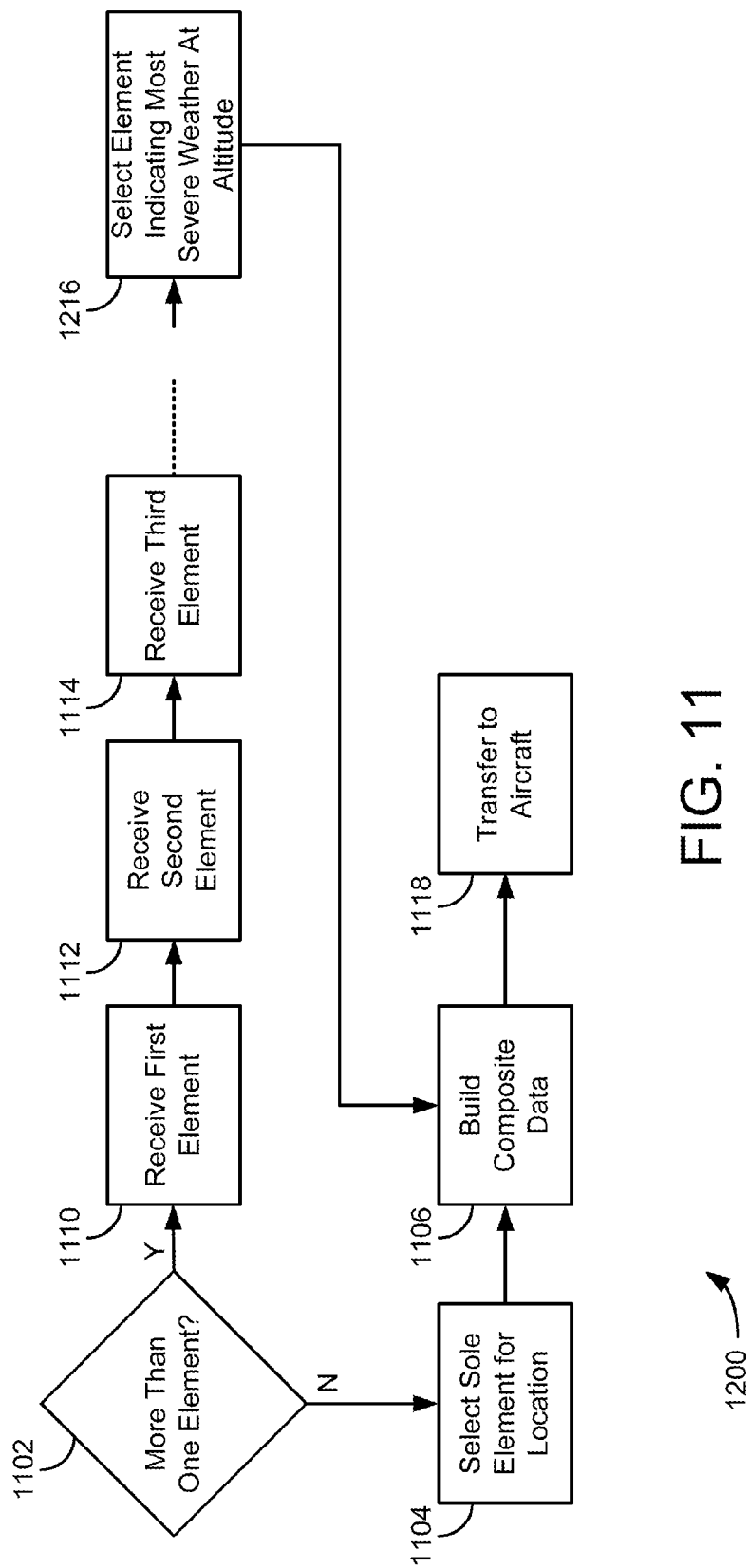
FIG. 11 is a process flow diagram of a method of selecting data from radar sources in accordance with an exemplary embodiment.

With reference to FIG. 11, a process 1200 is similar to process 1110. However, at a step 1216, elements are selected based upon elements that indicate the most severe weather at a particular altitude associated with aircraft 110. For example, the mosaic data may only utilize weather detected above a certain fixed altitude or an altitude associated with an aircraft altitude.

Figure 12:
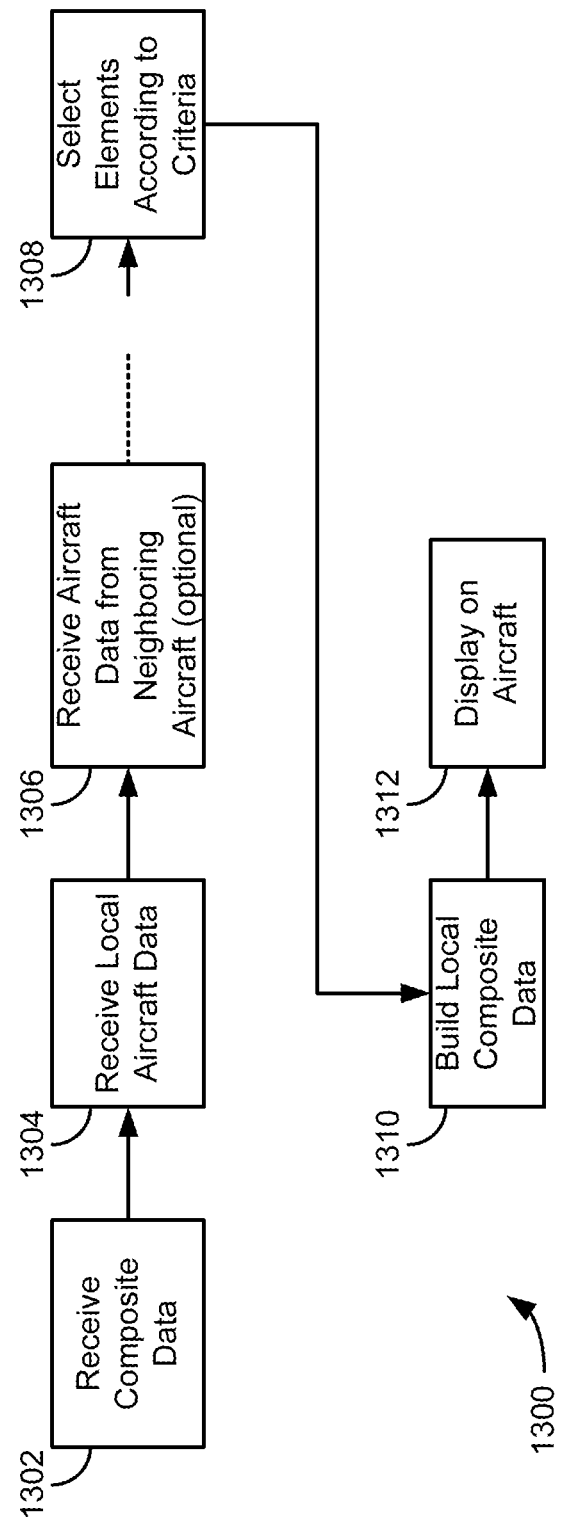
FIG. 12 is a process flow diagram of a method of providing composite data on-board an aircraft according to another exemplary embodiment.

With reference to FIG. 12, a process 1300 for use onboard an aircraft is described. At a step 1302, composite data is received from center 340. At step 1304, local aircraft data is received from system 302. At step 1306, an optional reception of aircraft data directly from neighboring aircraft can be used. At a step 1308, elements are selected according to criteria. As discussed above, the criteria can include age of data, weather activity detected, proximity to area of interest, quality of radar data and flight projection data.

At a step 1310, local composite data is created and at a step 1312, the local composite data is displayed on the aircraft.

Exemplary embodiments may include program products comprising computer or machine-readable media for carrying or having machine-executable instructions or data structures stored thereon. For example, aircraft weather detection system 400 may be computer driven. Exemplary embodiments illustrated in the methods of FIGS. 9-12 may be controlled by program products comprising computer or machine-readable media for carrying or having machine-executable instructions or data structures stored thereon. Such computer or machine-readable media can be any available media which can be accessed by a general purpose or special purpose computer or other machine with a processor. By way of example, such computer or machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of computer or machine-readable media. Computer or machine-executable instructions comprise, for example, instructions and data which cause a general purpose computer, special purpose computer, or special purpose processing machines to perform a certain function or group of functions. Software implementations of the present invention could be accomplished with standard programming techniques with rule based logic and other logic to accomplish the various connection steps, processing steps, comparison steps and decision steps.

It is also important to note that the construction and arrangement of the components as shown in the various exemplary embodiments is illustrative only. Although only a few embodiments have been described in detail in this disclosure, those skilled in the art who review this disclosure will readily appreciate that many modifications are possible (e.g., variations in dimensions, structures, shapes and proportions of the various elements, mounting arrangements, use of materials, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may be made in the design, operating conditions and arrangement of the various exemplary embodiments without departing from the scope of the present inventions as expressed in the appended claims.

What is claimed is:

1. A terrestrial system comprising:
electronics configured to receive aircraft weather radar data and terrestrial weather radar data, and configured to provide composite weather data, wherein the composite weather data comprises weather elements selected from the aircraft weather radar data and the terrestrial weather radar data, wherein one weather element for the composite weather data is selected from weather elements from a same region by selecting the one weather element of the weather elements from the same region using selection criteria comprising time of sensing each of the weather elements from the same region, wherein the electronics is configured to provide a command to an aircraft having an onboard weather radar system for requesting additional weather radar data according to a schedule of additional radar scans by the onboard weather radar system of the same region associated with the weather element to obtain the additional weather radar data, wherein the schedule provides a rate of the additional radar scans by the onboard weather radar system based upon a weather severity associated with the weather element.

2. The system of claim 1, wherein the electronics is configured to select the one weather element of the weather elements using the selection criteria comprising severity data and altitude for each element.

3. The system of claim 1, wherein weather radar systems located on a plurality of aircraft are configured to form a communication network.

4. The system of claim 1, wherein the additional radar scans by the onboard radar system occur between once per 20 minutes to once per 3 minutes.

5. The system of claim 4, wherein the schedule is set according to a geographic region.

6. The system of claim 1, wherein the composite data is mosaic data.

7. The system of claim 1, wherein the electronics is configured to select sequentially the additional weather radar data from two or more aircraft when the two or more aircraft sense the same region.

8. The system of claim 1, wherein the composite data is for display aboard the aircraft, and the electronics is configured to select the one weather element having a closest altitude to altitude of the aircraft.

9. A method of providing composite weather data for an aircraft, the method comprising:
receiving radar return data from at least two sources, wherein at least one source is an airborne source comprising a weather radar system;
providing using an electronic processor at a terrestrial unit composite data for use by the aircraft representing a map, the composite data including weather elements from each of the at least two sources, wherein one weather element for the composite weather data is selected from weather elements for a same region by selecting the one weather element of the weather elements for the same region using selection criteria comprising time of sensing the weather elements from the same region; and
requesting, by the electronic processor, additional weather radar data by setting a schedule for weather radar scans of the same region associated with the weather element by the airborne source, wherein a rate of the weather radar scans is requested based upon a weather type associated with the weather element.

10. The method of claim 9, wherein the composite data is interleaved data from the at least two sources and wherein the map includes nowcast data.

11. The method of claim 9, wherein the composite data includes elements, the elements being selected from at least one airborne source and based upon distance of weather to a radar sensor, time of sensing data, type of weather activity, quality of radar data, flight track or cell growth.

12. The method of claim 9, wherein the additional weather radar data is alternatively selected from a number of aircraft.

13. The method of claim 9, wherein weather elements from a number of aircraft are chosen for the composite weather data on a sequential basis.

14. The method of claim 9, wherein the data from the two sources is referenced geographically.

15. The method of claim 9, wherein the weather elements for the same region from the two or more sources are selected for the composite data using criteria based at least in part on at least one of radar source, altitude of the aircraft, and radar tilt angle.

16. The method of claim 9, wherein weather elements from a number of aircraft are chosen for the composite weather data on a sequential basis.

17. A method of providing composite weather data for a first aircraft, the method comprising:
receiving radar return data from at least two sources at a terrestrial unit, wherein at least one source is an airborne source using a weather radar system onboard a second aircraft;
providing using an electronic processor at the terrestrial unit composite data for use by the first aircraft representing a map, the composite data including weather elements from each of the at least two sources, wherein one weather element for the composite weather data is selected from weather elements for a same region by selecting the one weather element of the weather elements for the same region using selection criteria comprising time of sensing the weather elements from the same region; and
transmitting by the terrestrial unit a command to the second aircraft, the command indicating a schedule of additional radar scans to be performed by the weather radar system of the second aircraft to obtain additional weather radar data.

18. The method of claim 17, wherein the composite data is interleaved data from the at least two sources and wherein the map includes nowcast data.

19. The method of claim 17, wherein the composite data includes elements, the elements being selected from at least one airborne source and based upon distance of weather to a radar sensor, time of sensing data, type of weather activity, quality of radar data, flight track and cell growth.

20. The method of claim 17, wherein the additional weather radar data is alternatively selected from a number of aircraft.

* * * * *